(12) United States Patent
Duffy et al.

(10) Patent No.: US 7,676,638 B2
(45) Date of Patent: *Mar. 9, 2010

(54) COMBINED PESSIMISTIC AND OPTIMISTIC CONCURRENCY CONTROL

(75) Inventors: John Joseph Duffy, Renton, WA (US); Michael M. Magruder, Sammamish, WA (US); Goetz Graefe, Bellevue, WA (US); David Detlefs, Westford, WA (US); Vinod K. Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/197,043

(22) Filed: Aug. 22, 2008

(65) Prior Publication Data

US 2008/0319997 A1     Dec. 25, 2008

Related U.S. Application Data

(63) Continuation of application No. 11/499,091, filed on Aug. 4, 2006, now Pat. No. 7,434,010.

(51) Int. Cl.
*G06F 12/00* (2006.01)
(52) U.S. Cl. .............. 711/154; 707/2; 707/8; 707/104.1
(58) Field of Classification Search ............ None
See application file for complete search history.

(56) References Cited

U.S. PATENT DOCUMENTS

| | | | |
|---|---|---|---|
| 5,263,155 A | 11/1993 | Wang | |
| 5,778,179 A * | 7/1998 | Kanai et al. | 709/203 |
| 5,960,436 A | 9/1999 | Chang et al. | |
| 6,240,413 B1 | 5/2001 | Learmont | |
| 6,298,478 B1 * | 10/2001 | Nally et al. | 717/170 |
| 6,546,443 B1 | 4/2003 | Kakivaya et al. | |
| 6,681,226 B2 | 1/2004 | Bretl et al. | |
| 6,718,349 B2 | 4/2004 | Weedon | |
| 6,772,154 B1 * | 8/2004 | Daynes et al. | 707/8 |
| 6,826,757 B2 | 11/2004 | Steele, Jr. et al. | |
| 6,850,938 B1 | 2/2005 | Sadjadi | |
| 6,952,829 B1 | 10/2005 | Banavar et al. | |
| 7,478,210 B2 * | 1/2009 | Saha et al. | 711/159 |
| 2002/0116403 A1 | 8/2002 | Weedon | |
| 2002/0165727 A1 | 11/2002 | Greene et al. | |
| 2003/0033328 A1 | 2/2003 | Cha et al. | |

(Continued)

OTHER PUBLICATIONS

Herlihy, et al, "Transactional Memory: Architectural Supprot for Lock-Free Data Structures", In: ACM SIGARCH Computer Architecture News, 1993, vol. 21, Issue 2, pp. 289-300.

(Continued)

*Primary Examiner*—Jack A Lane

(57) ABSTRACT

Various technologies and techniques are disclosed that improve implementation of concurrency control modes in a transactional memory system. A transactional memory word is provided for each piece of data. The transactional memory word includes a version number, a reader indicator, and an exclusive writer indicator. The transactional memory word is analyzed to determine if the particular concurrency control mode is proper. Using the transactional memory word to help with concurrency control allows multiple combinations of operations to be performed against the same memory location simultaneously and/or from different transactions. For example, a pessimistic read operation and an optimistic read operation can be performed against the same memory location.

20 Claims, 14 Drawing Sheets

U.S. PATENT DOCUMENTS

| | | | |
|---|---|---|---|
| 2003/0200197 A1* | 10/2003 | Long et al. | 707/1 |
| 2003/0236786 A1 | 12/2003 | Shi et al. | |
| 2006/0036574 A1 | 2/2006 | Schweigkoffer et al. | |
| 2006/0136454 A1 | 6/2006 | Tchouati et al. | |
| 2007/0162520 A1* | 7/2007 | Petersen et al. | 707/202 |

OTHER PUBLICATIONS

International Search Report, PCT/US2007/015405, Jan. 23, 2008, pp. 1-10.

Atkins, et al, "Adaptable Concurrency Control for Atomic Data Types", Date: Aug. 1992, pp. 190-225, vol. 10, No. 3, Retrieved at <<http://portal.acm.org/citation.cfm?id=146939&coll=ACM&dl=ACM&CFID=176859&CFTOKEN=92839444>>.

Herlihy, Maurice, "Apologizing Versus asking permission: optimistic concurrency control for abstract data types", Date: Mar. 1990, pp. 96-124, vol. 15, No. 1, Retrieved at <<http://portal.acm.org/citation.cfm?id=77647&coll=ACM&dl=ACM&CFID=176859&CFTOKEN=92839444>>.

Herlihy, Maurice, "Optimistic Concurrency Control for Abstract Data Types", Date: 1986, pp. 206-217, Retrieved at <<http://delivery.acm.org/10.1145/20000/10608/p206-herlihy.pdf?key1=10608&key2=4622283511&coll=ACM&dl=ACM&CFID=176859&CFTOKEN=92839444>>.

Saha et al., "McRT-STM: A High Performance Software Transactional Memory System for a Multi-Core Runtime", Date: 2006, pp. 187-197, Retrieved at <<http://delivery.acm.org/10.1145/1130000/1123001/p187-saha.pdf?key1=1123001&key2=2983083511&coll=ACM&dl=ACM&CFID=176859&CFTOKEN=92839444>>.

\* cited by examiner

| ATTEMPT | EXISTING STATE / OPERATION | | | | | | | | |
|---|---|---|---|---|---|---|---|---|---|
| | | OR | OR | OR | PR | PR | PR | PW | PW | PW |
| | DIFF | SAME | ANCESTOR | DIFF | SAME | ANCESTOR | DIFF | SAME | ANCESTOR |
| OR | OK | OK | OK | OK | OK | OK | <CM> | OK | OK |
| PR | OK | OK | OK | <CM> | OK | OK | <CM> | OK | OK |
| PW | OK/<DOOM> | OK | OK | <CM> | OK | OK | <CM> | OK | OK |

LEGEND

EXISTING STATE (OF CURRENT OPERATION)
ATTEMPT (FOR NEW TRANSACTION)
 OR = OPTIMISTIC READ
 PR = PESSIMISTIC READ
 PW = PESSIMISTIC WRITE

OPERATION (SOME EXISTING OPERATION IN THE SYSTEM)
 DIFF = DIFFERENT TRANSACTION
 SAME = CURRENT TRANSACTION
 ANCESTOR = ANCESTOR OF THE CURRENT TRANSACTION

RESULTS
 OK = TRANSACTION WILL COMMIT
 <CM> = CONTENTION MANAGEMENT WILL GET INVOLVED
 OK/<DOOM> = CAUSES ANOTHER TRANSACTION TO BECOME INVOLVED AND WILL NOT COMMIT

FIG. 13

COMBINED PESSIMISTIC AND OPTIMISTIC CONCURRENCY CONTROL

CROSS-REFERENCE TO RELATED APPLICATIONS

This application claims priority to and is a continuation of co-pending U.S. patent application Ser. No. 11/499,091 entitled "Combined Pessimistic and Optimistic Concurrency Control" and filed Aug. 4, 2006, which issued as U.S. Pat. No. 7,434,010 on Oct. 7, 2008, which is incorporated herein by reference.

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. A data value in the context of transactional memory is the particular segment of shared memory being accessed, such as a single object, a cache line (such as in C++), a page, a single word, etc. There are two broad types of concurrency control lock modes in transactional memory systems: optimistic and pessimistic.

With optimistic concurrency control, the system attempts to make forward progress at the risk that a conflict will be detected later on. The transactional memory system performs automatic resolution of such conflicts, often by rolling back one of the conflicting transactions and re-executing it. Optimistic operations are relatively inexpensive when compared to pessimistic operations since they just read and do not involve writes to shared locations (i.e. taking a lock). As the name implies, the hope for optimistic operations is that there are few conflicts. If this turns out to be false, then there will be already wasted work, and the system must then proceed to throw it away and attempt to resolve the conflict. This takes extra time.

With pessimistic concurrency control in transactional memory systems, the system ensures that forward progress can be made safely and conflict-free by doing more work up front to prevent conflicts. This involves locking shared memory by making one or more writes to a shared location (i.e. a lock). As the name implies, this is used for systems or pieces of code that exhibit above average conflict rates. Modern transactional memory systems select one or the other, which often results in some transactions not being executed in the manner best suited for the target workload.

SUMMARY

Various technologies and techniques are disclosed that improve implementation of concurrency control modes in a transactional memory system. A transactional memory word is provided for each piece of data. The transactional memory word includes a version number, a reader indicator/count (e.g. for pessimistic readers), and an exclusive writer indicator. Before the system initiates a particular concurrency control mode, the transactional memory word is analyzed to determine if the particular concurrency control mode is proper. Using the transactional memory word to help with concurrency control allows multiple combinations of operations to be performed against the same memory location simultaneously and/or from different transactions. For example, a pessimistic read operation and an optimistic read operation can be performed against the same memory location.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 13 is a logical diagram view of a lock compatibility matrix for one implementation of a transactional memory system.

DETAILED DESCRIPTION

Figure 1:
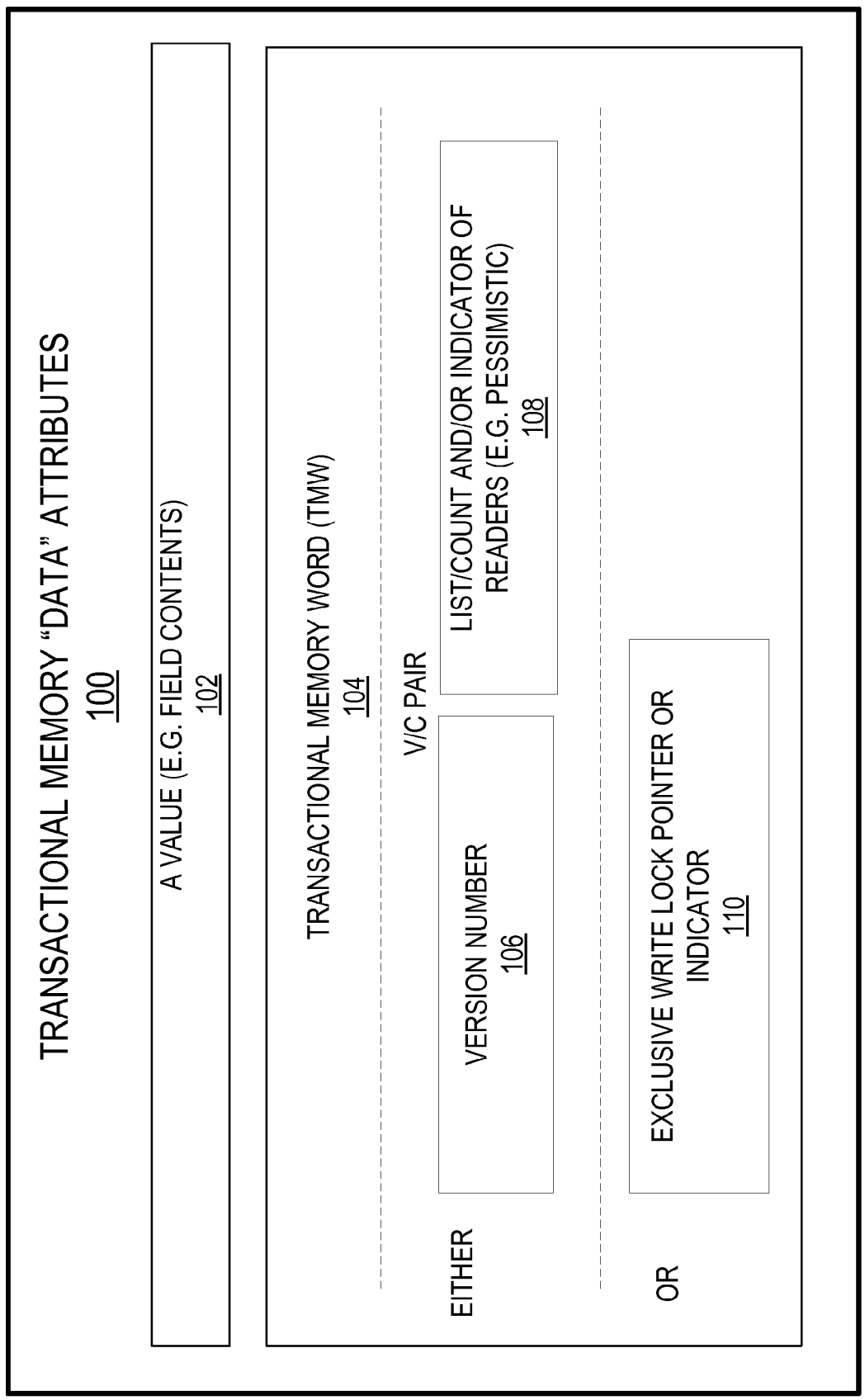
FIG. 1 is a diagrammatic view of transactional memory data attributes used by a transactional memory system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

FIG. 1 is a diagrammatic view of transactional memory data attributes used by a transactional memory system of one implementation. As shown in FIG. 1, transactional memory data attributes of a transactional memory system of one implementation includes a value 102 and a transactional memory word 104. The value 102 contains the actual field contents. The term "value" as used herein means the particular segment of shared memory being accessed, such as a single object, a cache line (such as in C++), a page, a single word, etc. The level of granularity of the transactional memory "value" being accessed can vary by platform and/or by other factors. The transactional memory word (referred to herein as TMW) 104 includes a version number 106 and a list/count and/or indicator of readers (e.g. pessimistic readers) 108. In one implementation, the list/count and/or indicator of readers 108 includes a count of the number of readers (e.g. pessimistic) accessing the particular value at a given point in time. In another implementation, the list/count and/or indicator of readers 108 includes a list of the particular readers (e.g. pessimistic) accessing the particular value at a given point in time. In yet another implementation, the list/count and/or indicator of readers 108 is simply an flag or other indicator to indicate that there are one or more readers (e.g. pessimistic) accessing the particular value at a given point in time. In the non-limiting examples presented herein for the sake of illustration, the version number 106 and the list/count and/or indicator of readers 108 are referred to as a Version/Count (V/C) pair, but other variations are also possible that do not include them grouped together.

In the implementation shown in FIG. 1, the transactional memory word 104 also includes an exclusive writer indicator/pointer 110. In one implementation, the exclusive writer indicator/pointer 110 contains an address of the operation currently holding the exclusive lock, such as a pointer to a write log entry. In another implementation, the exclusive writer indicator/pointer 110 is a flag that indicates an exclusive lock is currently held for the value associated with the TMW. While a Version/Count pair and exclusive writer indicator are shown as the TMW attributes in the examples described herein, it will be appreciated that other TMW attributes and/or combinations thereof could alternatively or additionally be used in other implementations to indicate version numbers, write locks, etc. for use by a transactional memory system to make concurrency control decisions.

Figure 2:
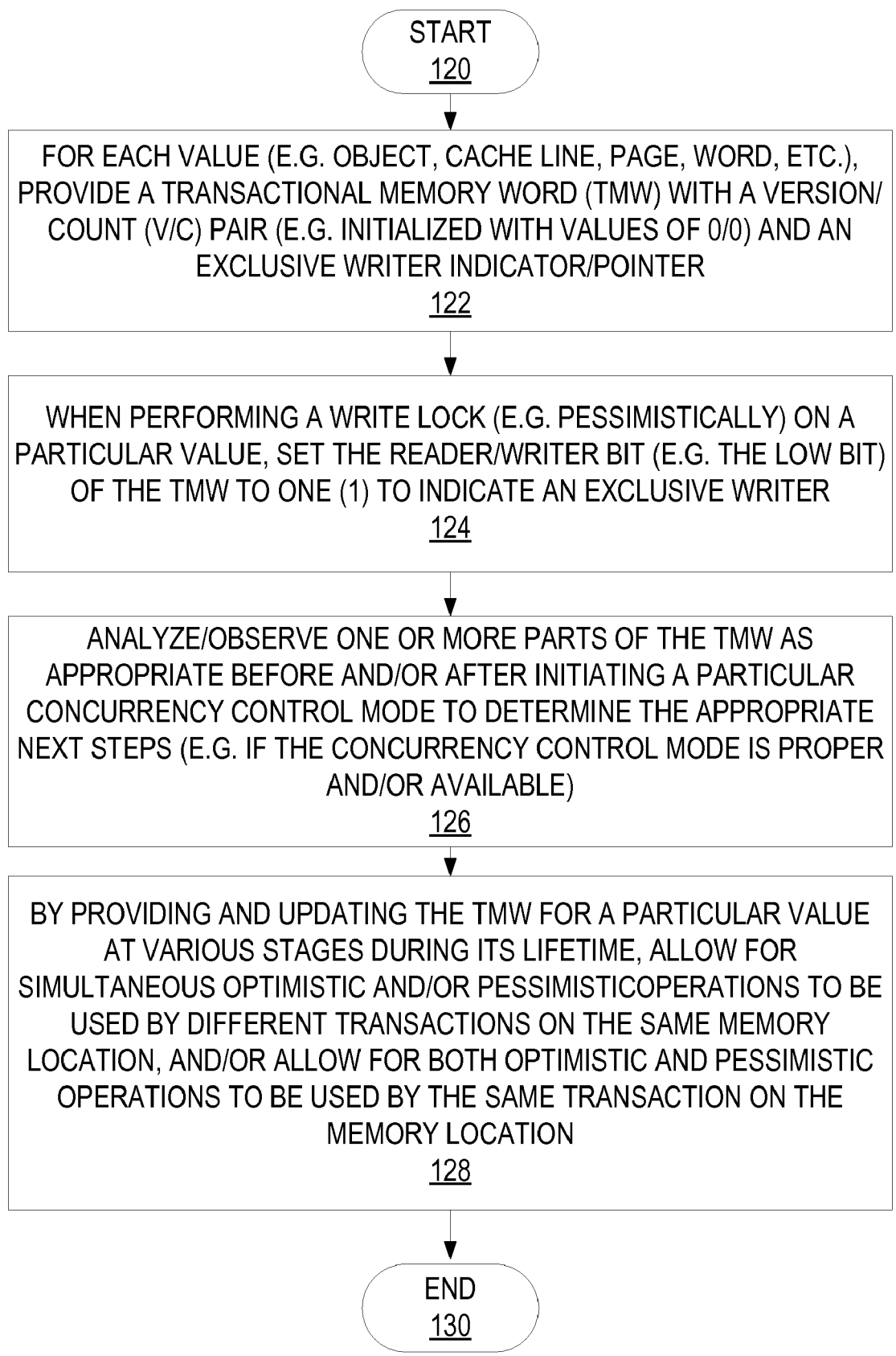
FIG. 2 is a process flow diagram for one implementation of a transactional memory system illustrating the stages involved in using a transactional memory word (TMW) to help manage concurrency control modes.

Turning now to FIG. 2, a process flow diagram for one implementation of a transactional memory system is shown that illustrates the stages involved in using a transactional memory word (TMW) to help manage concurrency control modes. In one form, the process of FIG. 2 is at least partially implemented in the operating logic of computing device 400 (in FIG. 14). The procedure begins at start point 120 with providing a transactional memory word (TMW) with a version/count (V/C) pair (e.g. initialized with values of 0/0) and an exclusive writer indicator/pointer for each value (e.g. object, cache line, page, word, etc.) (stage 122). When taking a write lock (e.g. pessimistically) on a particular value, the system sets the reader/writer bit (e.g. the low bit) of the TMW to one (1) to indicate an exclusive writer (stage 124).

One or more parts of the TMW are analyzed or observed as appropriate before and/or after initiating a particular concurrency control mode to determine the appropriate next steps (e.g. if the operation and/or lock is proper and/or available) (stage 126). By providing and updating the TMW for a particular value at various stages during its lifetime, the system allows for simultaneous optimistic and/or pessimistic operations to be used by different transactions on the same memory location, and/or allows for both optimistic and pessimistic operations to be used by the same transaction on the memory location (stage 128). In one implementation, nesting of transactions is supported. For example, in case of write locks and pessimistic read locks, only the top-most ancestor actually releases these locks when committing. In nested transactions, they are simply "passed" back to the parent (i.e. committed into) during commit, and released directly during rollback. In one implementation, decisions about which operation to use (pessimistic versus optimistic, etc.) can be made dynamically upon using some of the technologies and techniques discussed herein. The process then ends at end point 130.

Figure 3:
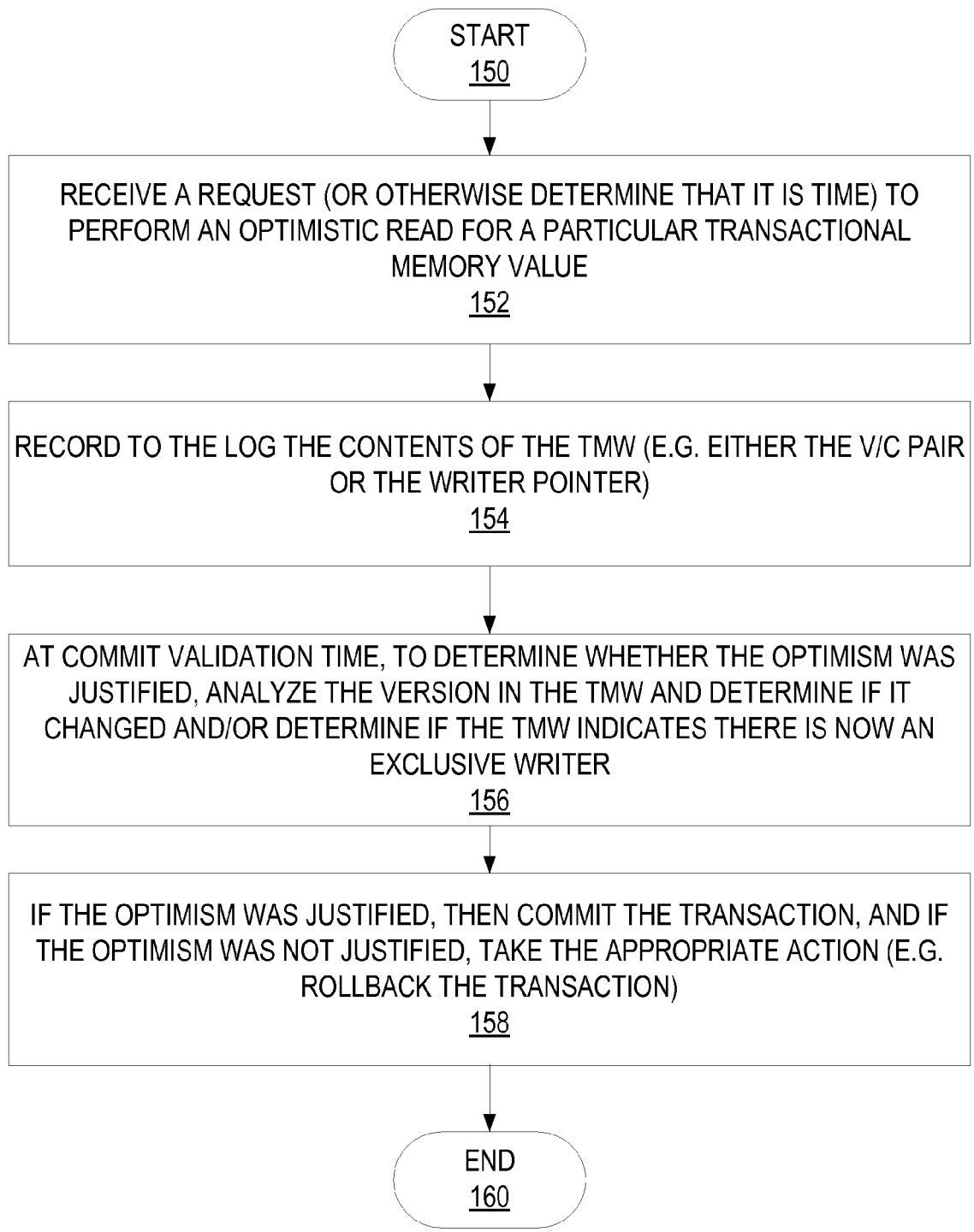
FIG. 3 is a process flow diagram for one implementation of a transactional memory system illustrating the stages involved in using a transactional memory word (TMW) to help manage optimistic reads.
Figure 4:
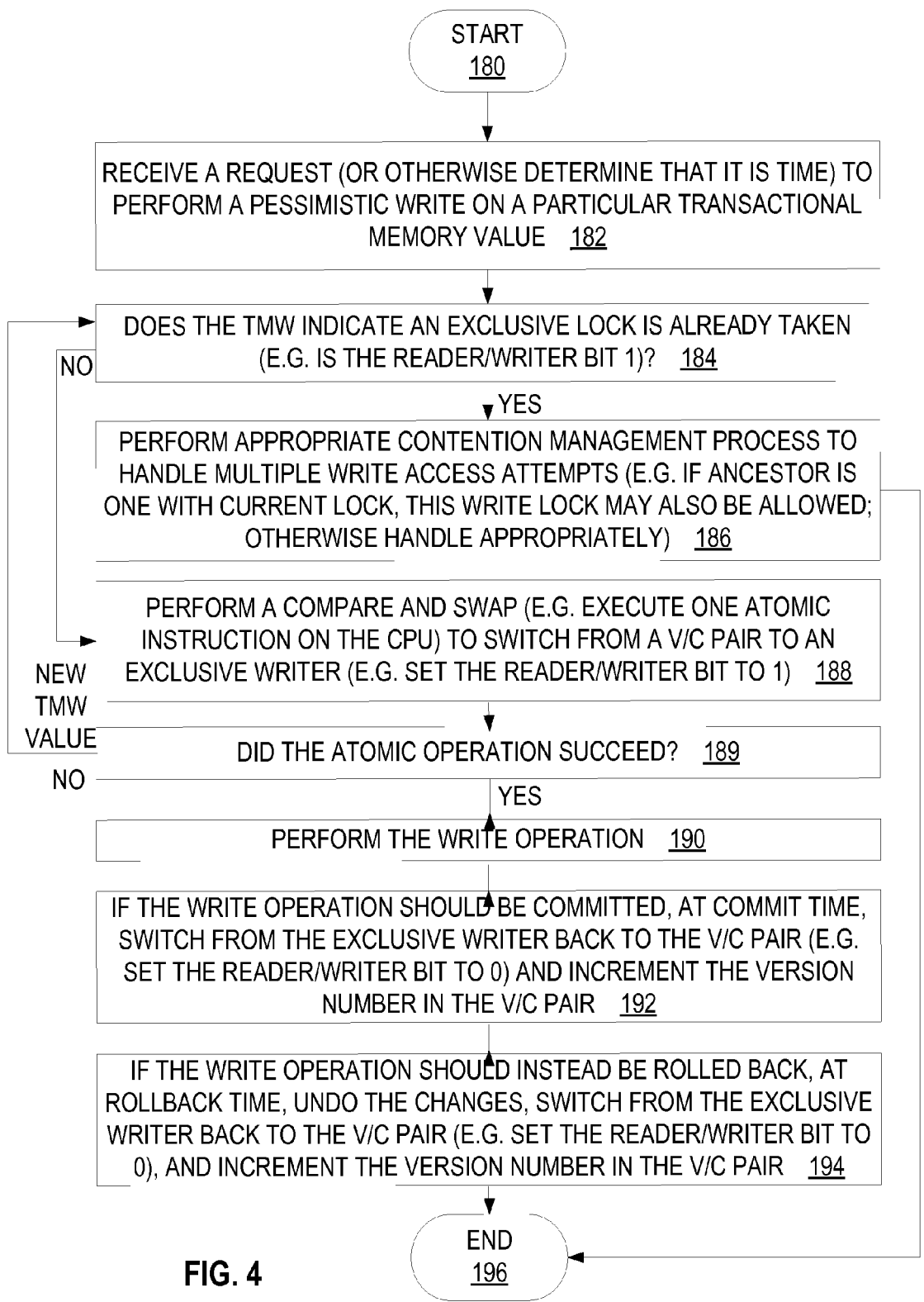
FIG. 4 is a process flow diagram for one implementation of a transactional memory system illustrating the stages involved in using a transactional memory word (TMW) to help manage pessimistic writes.
Figure 5:
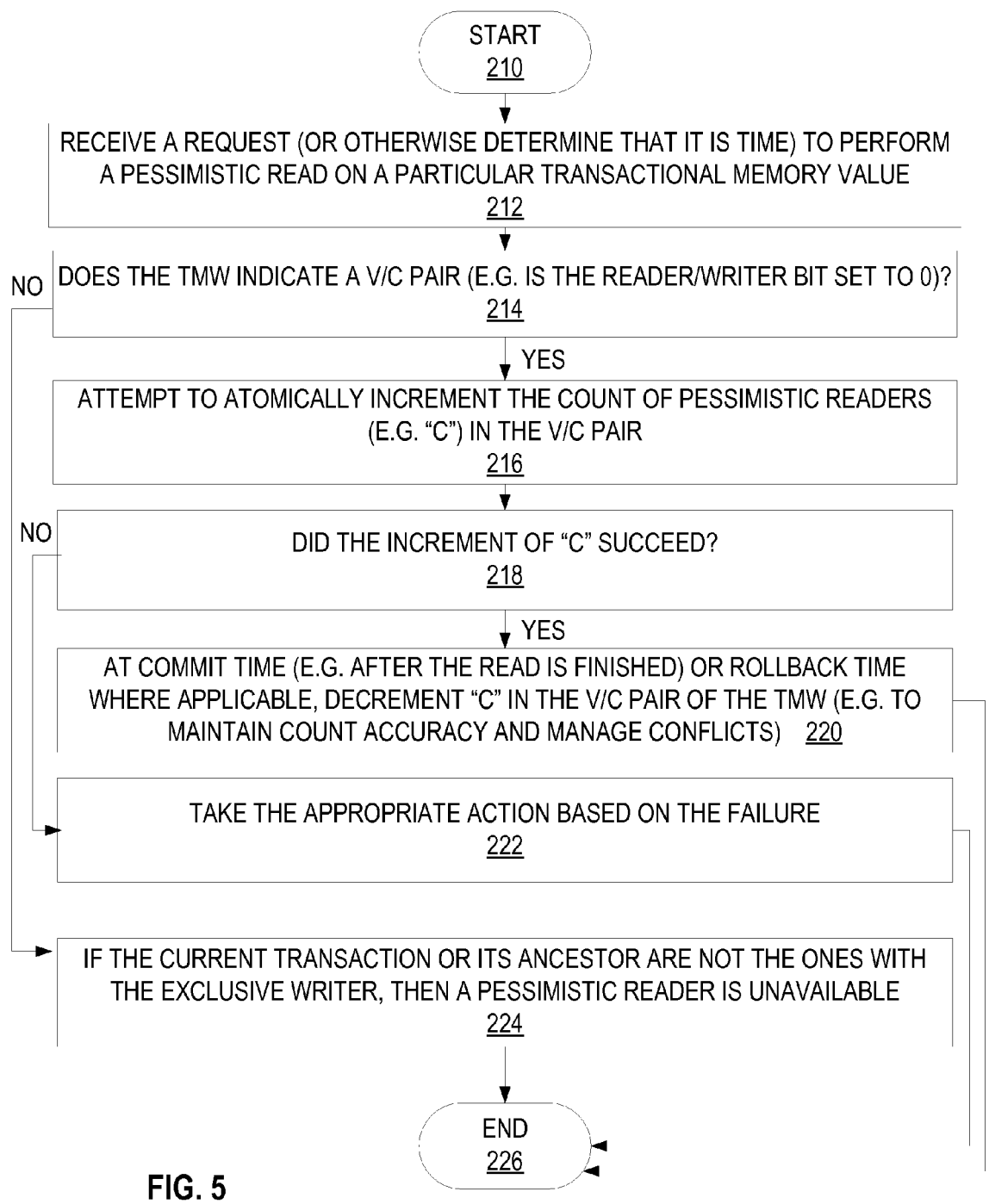
FIG. 5 is a process flow diagram for one implementation of a transactional memory system illustrating the stages involved in using a transactional memory word (TMW) to help manage pessimistic reads.

FIGS. 3-5 illustrate one implementation of how the transactional memory word changes based upon the various types of concurrency control modes used, such as pessimistic read, optimistic read, pessimistic write, etc. FIGS. 6-12 then illustrate how some optimistic and pessimistic operations can be combined together using the TMW with some of the processes illustrated in FIGS. 3-5.

Turning now to FIG. 3, a process flow diagram is shown for one implementation of a transactional memory system illustrating the stages involved in using a transactional memory word (TMW) to help manage optimistic reads. In one form, the process of FIG. 3 is at least partially implemented in the operating logic of computing device 400 (in FIG. 14). The procedure begins at start point 150 with receiving a request (or otherwise determining that it is time) to perform an optimistic read for a particular transactional memory value (stage 152). The system records the contents of the TMW (e.g. either the V/C pair or the writer pointer) to the transactional memory log (stage 154).

At commit validation time, to determine whether the optimism was justified, the system analyzes the version in the TMW and determines if it changed and/or determines if the TMW indicates there is now an exclusive writer (stage 156). In one implementation, if the TMW contains an exclusive writer, then there are multiple possible scenarios that need considered to determine if the optimism was justified and if the transaction should be committed, such as: (1) if the transaction performed a write operation after the current read, then the version number is analyzed to be sure there was not an intervening writer (e.g. the version number at the time of the read is compared to the version number at the time of the write); (2) If an ancestor transaction performed a write operation before the current read operation, then that write operation is allowed and validated; (3) If another transaction has a write lock, then validation fails. If the result of the analysis reveals that optimism was justified, then the transaction is committed, and if the optimism was not justified, the appropriate action is taken (e.g. rolling back the transaction) (stage 158). The process then ends at end point 160.

FIG. 4 is a process flow diagram for one implementation of a transactional memory system illustrating the stages involved in using a transactional memory word (TMW) to help manage pessimistic writes. In one form, the process of FIG. 4 is at least partially implemented in the operating logic of computing device 400 (in FIG. 14). The procedure begins at start point 180 with receiving a request (or otherwise determining that it is time) to perform a pessimistic write on a particular transactional memory value (stage 182). If the TMW indicates that an exclusive lock is already taken (e.g. is reader/writer bit 1) by another transaction besides itself or an ancestor (decision point 184), then the system performs the appropriate contention management process to handle multiple write access attempts (stage 186). A compare and swap is performed (e.g. one atomic instruction is executed on the CPU) to switch from the V/C pair to an exclusive writer (e.g. by setting the reader/writer bit to 1) (stage 188). If the atomic operation (e.g. the compare and swap) is not successful (decision point 189), then the process returns to stage 182 with the new TMW value. If the atomic operation is successful (decision point 189), the write operation is then performed (stage 190). If the write operation should be committed, then at commit time, the exclusive writer is switched back to the V/C pair (e.g. by setting the reader/writer bit to 0) and the version number in the V/C pair is incremented (stage 192). If the write operation should instead be rolled back, then the changes are undone, the exclusive writer is switched back to the V/C pair, and the version number is incremented (stage 194) to keep other transactions from improperly validating. The process then ends at end point 196.

In one implementation, optimistic writes are not used at all. In another implementation, alternatively or additionally to pessimistic writes, TMW's can be used to help manage optimistic writes. In one implementation of the optimistic scenario, a side buffer can be used to log written values. During the first phase of the commit, the write operation would temporarily acquire the exclusive write lock for that location. During the second phase of the commit, the write operation would apply the buffered writes to the locations written to, and ensure that the version incremented before releasing the lock.

FIG. 5 is a process flow diagram for one implementation of a transactional memory system illustrating the stages involved in using a transactional memory word (TMW) to help manage pessimistic reads. In one form, the process of FIG. 5 is at least partially implemented in the operating logic of computing device 400 (in FIG. 14). The procedure begins at start point 210 with receiving a request (or otherwise determining that it is time) to perform a pessimistic read on a particular transactional memory value (stage 212). If the TMW does not indicate a V/C pair (e.g. if the reader/writer bit is set to 1) (decision point 214), and if the current transaction or its ancestor is not the one with the exclusive writer, then a pessimistic reader is not available (stage 224). If the TMW indicates a V/C pair (e.g. if the reader/writer bit is set to 0) (decision point 214), then the system attempts to atomically increment the count of pessimistic readers (e.g. "C") in the V/C pair (stage 216).

If the increment of "C" succeeded (decision point 218), then at commit time or rollback time where applicable, the system decrements "C" in the V/C pair of the TMW (e.g. to maintain count accuracy and manage conflicts) (stage 220). If the increment of "C" failed (decision point 214), then the system takes the appropriate action based on the failure (stage 222). As one non-limiting example, if the increment fails due to a race with another pessimistic reader incrementing or decrementing, then the increment can be repeated until it succeeds. As another non-limiting example of the appropriate action taken, if the increment fails because the TMW transitioned to an exclusive writer, then contention management will take the appropriate action. The process then ends at end point 226.

Figure 6:
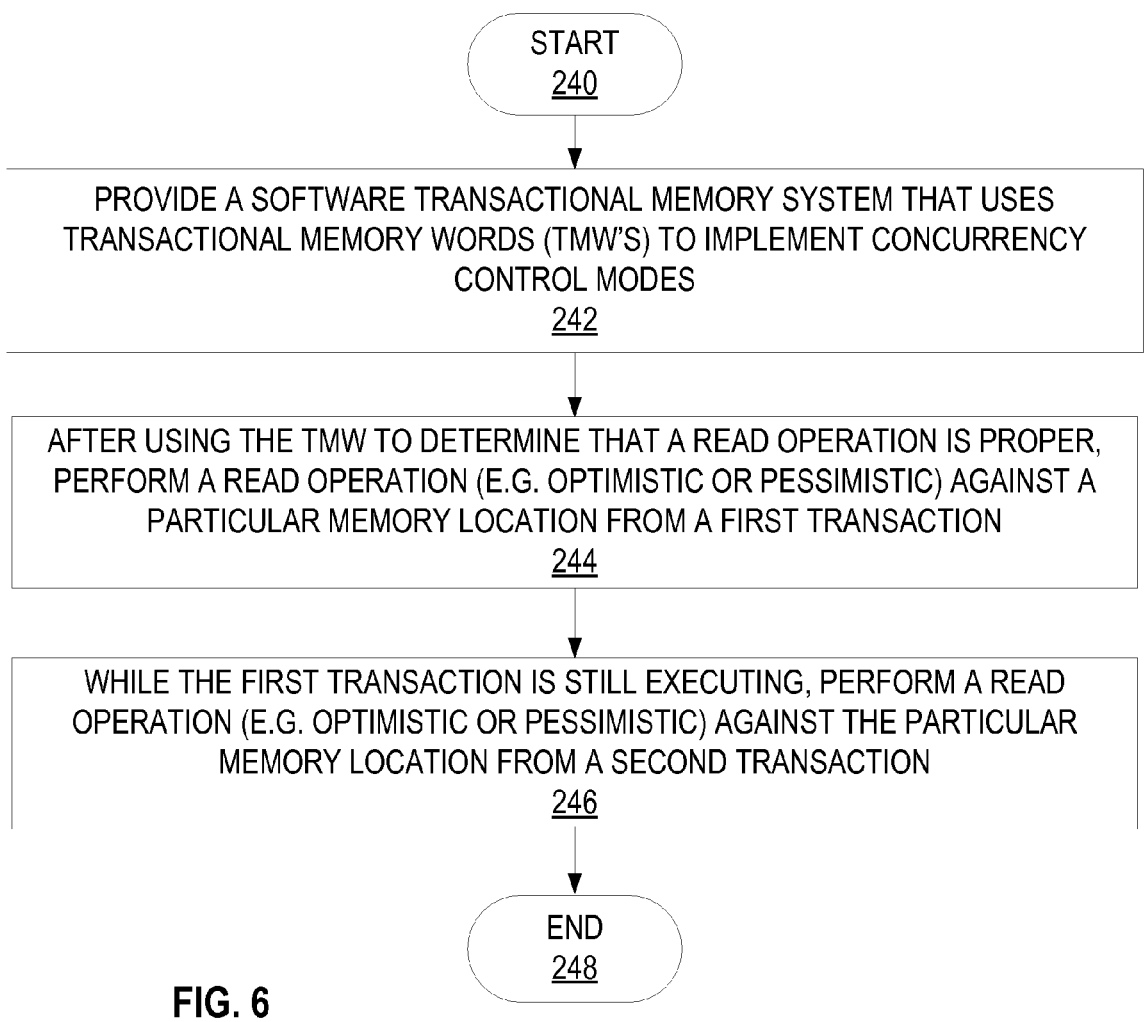
FIG. 6 is a process flow diagram for one implementation of a transactional memory system illustrating the stages involved in using a transactional memory word (TMW) to enable simultaneous operations against the same memory location.

Turning now to FIGS. 6-12, several examples will be described for how the TMW can be used in various scenarios to allow for combinations of optimistic and pessimistic operations on the same memory location and/or from the same transaction. FIG. 6 is a process flow diagram for one implementation of a transactional memory system illustrating the stages involved in using a transactional memory word (TMW) to enable simultaneous operations against the same memory location. In one form, the process of FIG. 6 is at least partially implemented in the operating logic of computing device 400 (in FIG. 14).

The procedure begins at start point 240 with providing a software transactional memory system that uses transactional memory words (TMW's) to implement concurrency control modes (stage 242). After using the TMW appropriately for determining that a read operation is proper, the system performs a read operation (e.g. optimistic or pessimistic) against a particular memory location from a first transaction (stage 244). While the first transaction is still executing, the system performs a read operation (e.g. optimistic or pessimistic) against the particular memory location from a second transaction (again after using the TMW appropriately for determining that the read operation was proper) (stage 246). The process ends at end point 248.

Figure 7:
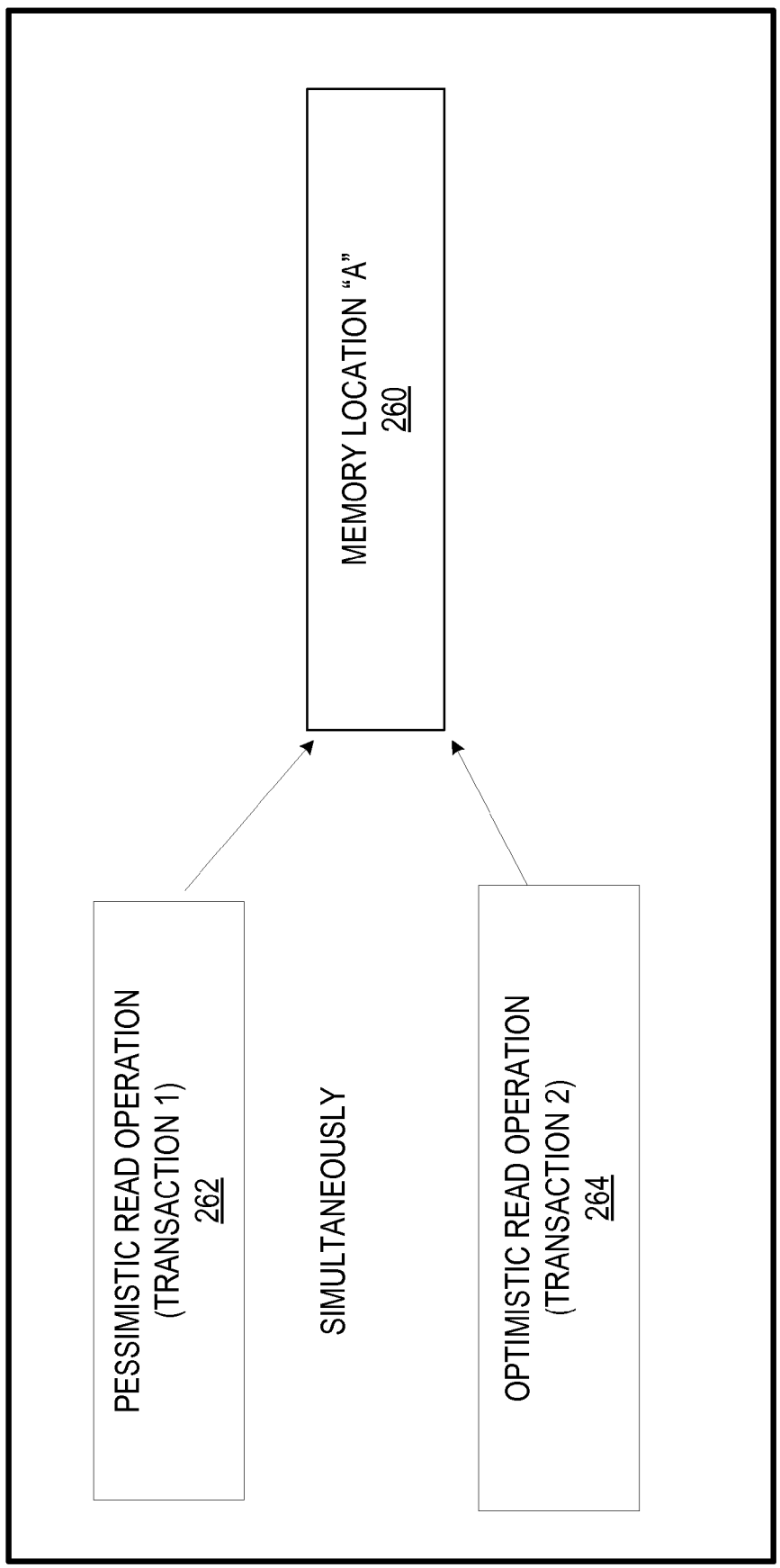
FIG. 7 is a logical diagram view of one implementation of a transactional memory system of FIG. 6 illustrating simultaneous operations on the same memory location.

FIG. 7 is a logical diagram view of one implementation of a transactional memory system of FIG. 6 illustrating simultaneous operations on the same memory location. When the TMW is first initialized, the value in the V/C pair is (0,0). In the example shown, memory location "A" 260 is accessed from an pessimistic read operation 262 from a first transaction (transaction 1). At that point, the V/C pair is (0,1) to indicate there is one pessimistic reader. The version number is not changed by the pessimistic reader. At the same time (at least in part), memory location "A" 260 is also accessed from an optimistic operation 264 from a second transaction (transaction 2). The optimistic read does not modify the count in the V/C pair, but records (0,1) to its transaction log. Before committing, the system checks to make sure there is not an exclusive writer and that the version has not changed in the meantime. The pessimistic count is ignored entirely at commit time.

Figure 8:
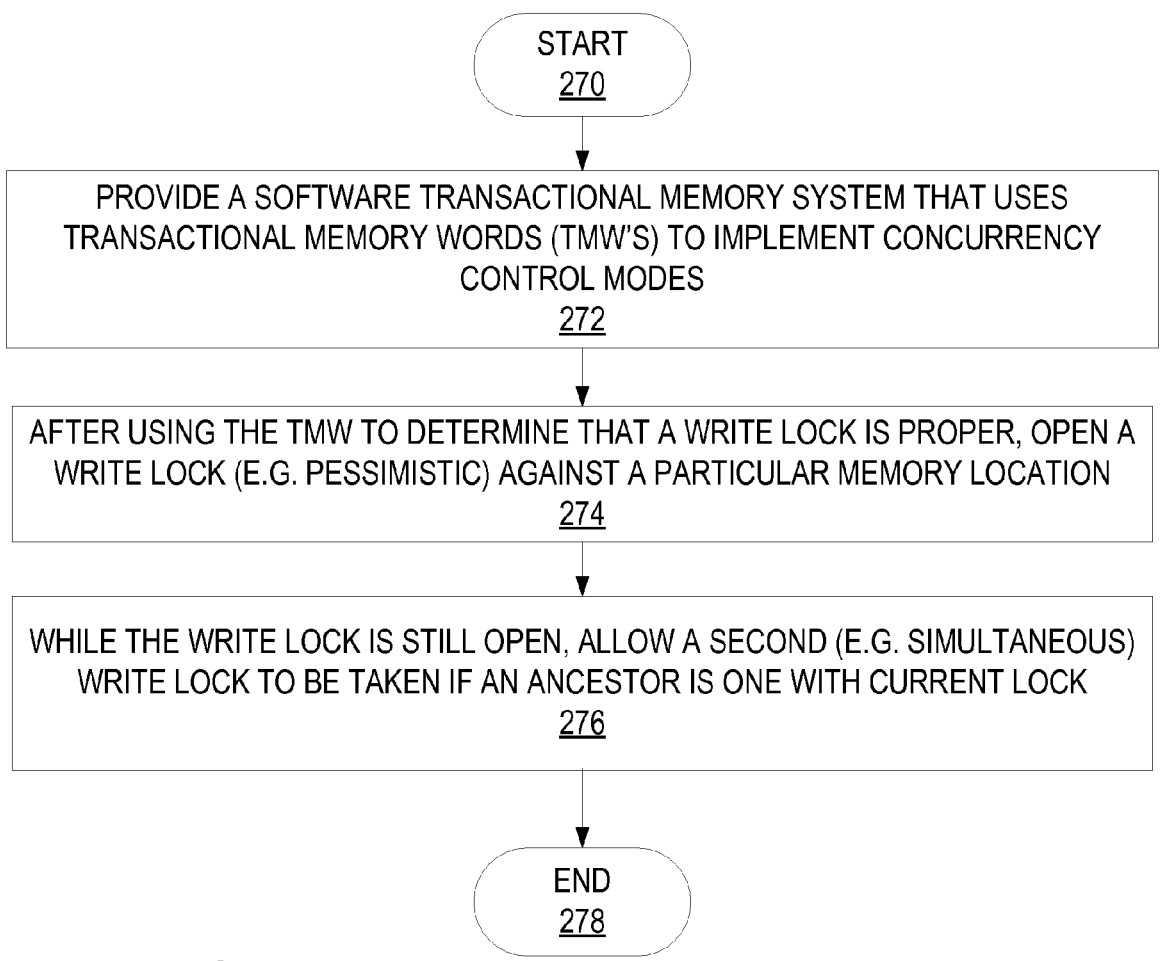
FIG. 8 is a process flow diagram for one implementation of a transactional memory system illustrating the stages involved in using a transactional memory word (TMW) to enable multiple write operations against the same memory location.

FIG. 8 is a process flow diagram for one implementation of a transactional memory system illustrating the stages involved in using a transactional memory word (TMW) to enable multiple write operations against the same memory location. In one form, the process of FIG. 8 is at least partially implemented in the operating logic of computing device 400 (in FIG. 14). The procedure begins at start point 270 with providing a software transactional memory system that uses transactional memory words (TMW's) to implement concurrency control modes (stage 272). After using the TMW to determine that a write lock is proper, the system opens a write lock (e.g. pessimistic) against a particular memory location (stage 274). While the write lock is still open, a second (e.g. simultaneous) write lock is allowed to be taken if an ancestor is the one with the current write lock (stage 276). In one implementation, this involves write lock stealing whereby the write lock is "stolen" from the ancestor to allow the child to use it. The process then ends at end point 278.

Figure 9:
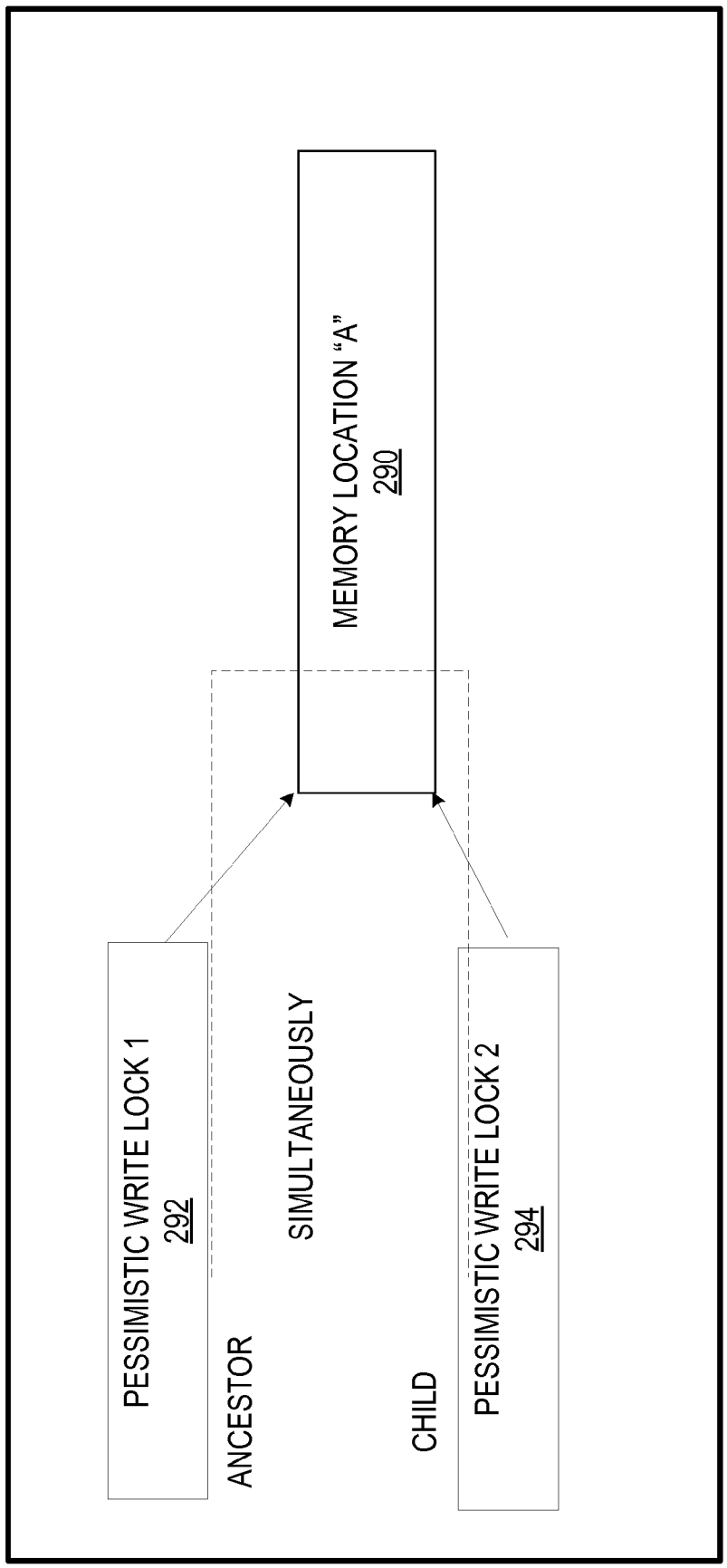
FIG. 9 is a logical diagram view of one implementation of a transactional memory system of FIG. 8 illustrating multiple write operations on the same memory location.

FIG. 9 is a logical diagram view of one implementation of a transactional memory system of FIG. 8 illustrating multiple write locks on the same memory location. In the example shown, memory location "A" 290 is accessed and locked by a first exclusive pessimistic writer (pessimistic write lock 1) 292. While the first exclusive write lock is still held, a second exclusive write lock (pessimistic write lock 2) 294 is also allowed by a child operation of the ancestor holding the first lock.

Figure 10:
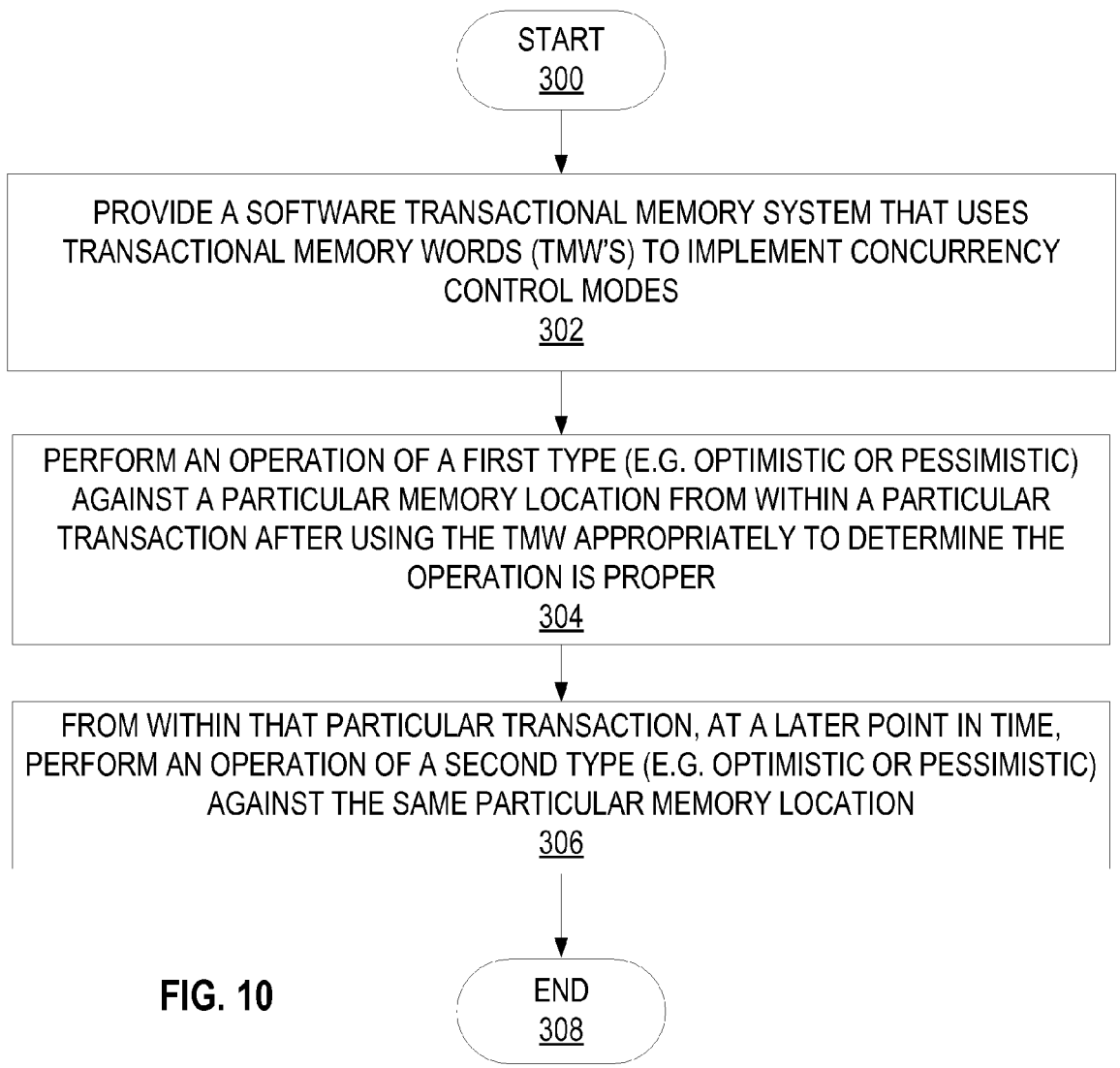
FIG. 10 is a process flow diagram for one implementation of a transactional memory system illustrating the stages involved in using a transactional memory word (TMW) to enable multiple operations against the same memory location from within the same transaction.

FIG. 10 is a process flow diagram for one implementation of a transactional memory system illustrating the stages involved in using a transactional memory word (TMW) to enable multiple operations against the same memory location from within the same transaction. In one form, the process of FIG. 10 is at least partially implemented in the operating logic of computing device 400 (in FIG. 14). The procedure begins at start point 300 with providing a software transactional memory system that uses transactional memory words (TMW's) to implement concurrency control modes (stage 302). The system performs an operation of a first type (e.g. optimistic or pessimistic) against a particular memory location from within a particular transaction after using the TMW appropriately to determine the operation is proper (stage 304). From within that particular transaction, at a later point in time, the system performs an operation of a second type (e.g. optimistic or pessimistic) against the same particular memory location (stage 306). The process then ends at end point 308.

Figure 11:
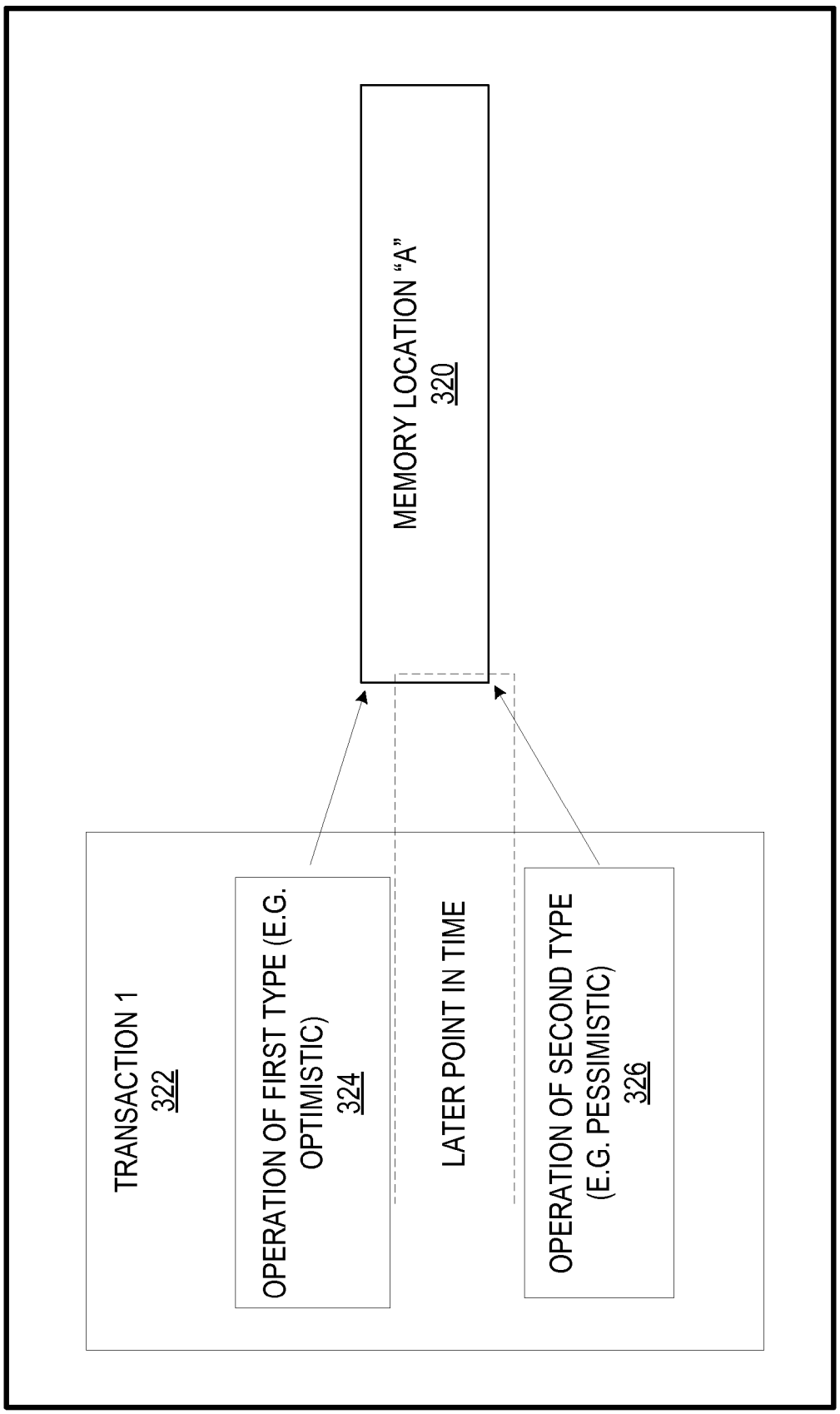
FIG. 11 is a logical diagram view of one implementation of a transactional memory system of FIG. 10 illustrating an optimistic and pessimistic operation on the same memory location from within the same transaction.

FIG. 11 is a logical diagram view of one implementation of a transactional memory system of FIG. 10 illustrating an optimistic and pessimistic operation on the same memory location from within the same transaction. In the example shown, memory location "A" 320 is accessed by a first type of operation (e.g. an optimistic one) 324 from within a transaction (transaction 1) 322. At a later point in time, memory location "A" 320 is accessed by a second and different type of operation (e.g. a pessimistic one) 326 from within the same transaction 322. In one implementation, such a transaction is able to successfully commit, as long as no concurrent updates occur between the optimistic and pessimistic read.

Figure 12:
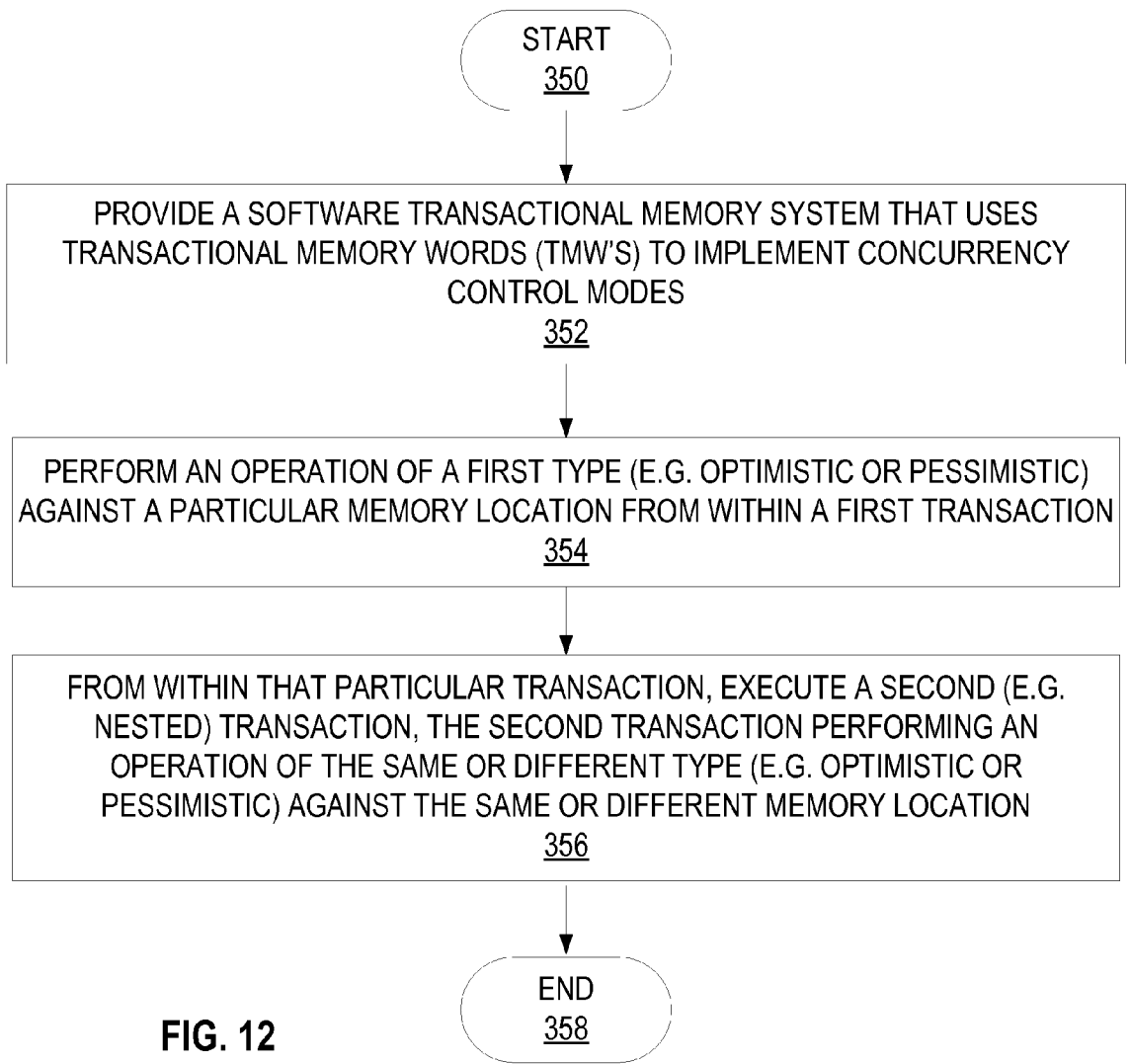
FIG. 12 is a process flow diagram for one implementation of a transactional memory system illustrating the stages involved in using a transactional memory word (TMW) to enable nested transactions that use various combinations of concurrency control operations.

FIG. 12 is a process flow diagram for one implementation of a transactional memory system illustrating the stages involved in using a transactional memory word (TMW) to enable nested transactions that use various combinations of concurrency control operations. In one form, the process of FIG. 12 is at least partially implemented in the operating logic of computing device 400 (in FIG. 14). The procedure begins at start point 350 with providing a software transactional memory system that uses transactional memory words (TMW's) to implement concurrency control modes (stage 352). The system performs an operation of a first type (e.g. optimistic or pessimistic) against a particular memory location from within a first transaction after using the TMW appropriately to determine the operation is proper (stage 354). From within that particular transaction, the system executes a second (e.g. nested) transaction (again upon using the TMW appropriately), with the second transaction performing an operation of the same or different type (e.g. optimistic or pessimistic) against the same or different memory location (stage 356). The process then ends at end point 358.

FIG. 13 is a logical diagram view of a lock compatibility matrix 370 for one implementation of a transactional memory system. Lock compatibility matrix illustrates some non-limiting examples of various scenarios that involve two different operations, and illustrates the results when those two operations happen together. For example, if an optimistic read 372 is already in process in a different transaction 374, and another optimistic read is attempted 376, the result is OK 378 (both operations will be successful).

Figure 14:
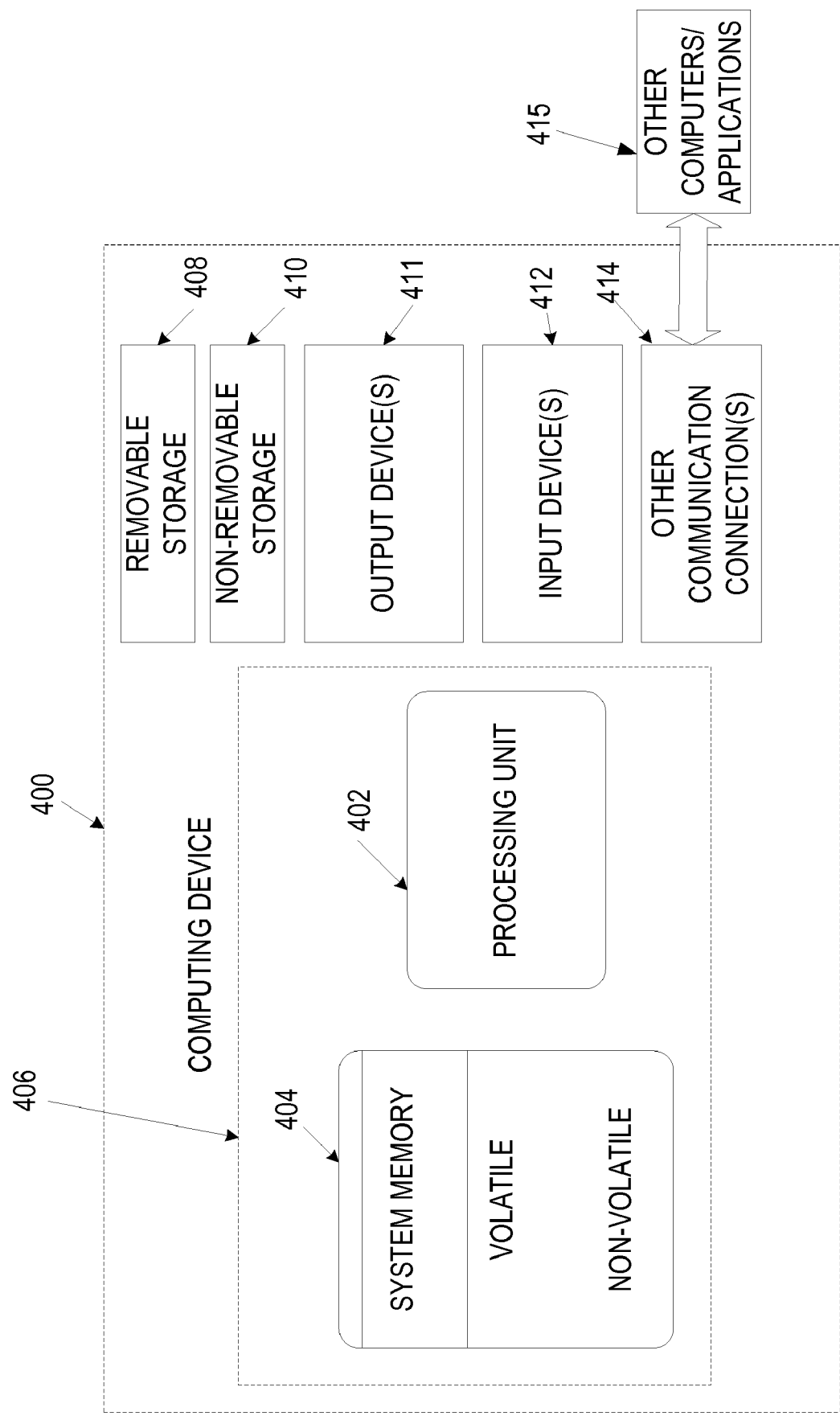
FIG. 14 is a diagrammatic view of a computer system of one implementation.

As shown in FIG. 14, an exemplary computer system to use for implementing one or more parts of the transactional memory system described herein includes a computing device, such as computing device 400. In its most basic configuration, computing device 400 typically includes at least one processing unit 402 and memory 404. Depending on the exact configuration and type of computing device, memory 404 may be volatile (such as RAM), non-volatile (such as ROM, flash memory, etc.) or some combination of the two. This most basic configuration is illustrated in FIG. 14 by dashed line 406.

Additionally, device 400 may also have additional features/functionality. For example, device 400 may also include additional storage (removable and/or non-removable) including, but not limited to, magnetic or optical disks or tape. Such additional storage is illustrated in FIG. 14 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Computing device 400 includes one or more communication connections 414 that allow computing device 400 to communicate with other computers/applications 415. Device 400 may also have input device(s) 412 such as keyboard, mouse, pen, voice input device, touch input device, etc. Output device(s) 411 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, and/or data layouts as described in the examples discussed herein could be organized differently on one or more computers to include fewer or additional options or features than as portrayed in the examples.

What is claimed is:

1. A method for concurrency control in a transactional memory system, comprising:
provide a software transactional memory system that uses a transactional memory word to implement a plurality of concurrency control modes for a particular memory location;
from within a first transaction, perform a first operation against the particular memory location; and from within the first transaction, execute a second transaction, the second transaction performing a second operation against the particular memory location.

2. The method of claim 1, wherein the first operation and the second operation are of a same type.

3. The method of claim 2, wherein the type of operation is pessimistic.

4. The method of claim 2, wherein the type of operation is optimistic.

5. The method of claim 1, wherein the first operation and second operation are of different types.

6. The method of claim 5, wherein a type of the first operation is pessimistic.

7. The method of claim 5, wherein a type of the first operation is optimistic.

8. The method of claim 1, wherein the transactional memory word comprises a plurality of attributes, the attributes including a version number, a reader indicator, and an exclusive writer indicator.

9. The method of claim 1, wherein a type of the first operation is determined dynamically.

10. A computer-readable storage medium having computer-executable instructions for causing a computer to perform the steps recited in claim 1.

11. A method for concurrency control in a transactional memory system, comprising:

provide a software transactional memory system that uses a transactional memory word to implement a plurality of concurrency control modes for a first memory location and a second memory location;

from within a first transaction, perform a first operation against the first memory location; and from within the first transaction, execute a second transaction, the second transaction performing a second operation against the second memory location.

12. The method of claim 11, wherein the first operation and the second operation are of a same type.

13. The method of claim 12, wherein the type of operation is pessimistic.

14. The method of claim 12, wherein the type of operation is optimistic.

15. The method of claim 11, wherein the first operation and second operation are of different types.

16. The method of claim 15, wherein a type of the first operation is pessimistic.

17. The method of claim 15, wherein a type of the first operation is optimistic.

18. The method of claim 11, wherein the transactional memory word comprises a plurality of attributes, the attributes including a version number, a reader indicator, and an exclusive writer indicator.

19. The method of claim 11, wherein a type of the first operation is determined dynamically.

20. A computer-readable storage medium having computer-executable instructions for causing a computer to perform the steps recited in claim 11.

* * * * *